(12) United States Patent
Cohen et al.

(10) Patent No.: US 10,647,601 B2
(45) Date of Patent: May 12, 2020

(54) METHOD FOR BIOREMEDIATION OF CONTAMINATED WATER

(71) Applicant: MEKOROT WATER COMPANY, LTD, Tel-Aviv (IL)

(72) Inventors: Ram Cohen, Ashkelon (IL); Eliora Ron, Tel Aviv (IL); Eugene Rosenberg, Givat Shmuel (IL)

(73) Assignee: MEKOROT WATER COMPANY, LTD, Tel-Aviv (IL)

( * ) Notice: Subject to any disclaimer, the term of this patent is extended or adjusted under 35 U.S.C. 154(b) by 0 days.

(21) Appl. No.: 15/322,825

(22) PCT Filed: Jul. 2, 2015

(86) PCT No.: PCT/IL2015/050685
§ 371 (c)(1),
(2) Date: Dec. 29, 2016

(87) PCT Pub. No.: WO2016/001928
PCT Pub. Date: Jan. 7, 2016

(65) Prior Publication Data
US 2018/0201531 A1 Jul. 19, 2018

(30) Foreign Application Priority Data
Jul. 2, 2014 (IL) .......................................... 233483

(51) Int. Cl.
*C02F 3/34* (2006.01)
*B09C 1/00* (2006.01)
(Continued)

(52) U.S. Cl.
CPC .............. *C02F 3/341* (2013.01); *B09C 1/002* (2013.01); *B09C 2101/00* (2013.01); *C02F 2101/32* (2013.01); *C02F 2103/10* (2013.01)

(58) Field of Classification Search
CPC ........... B09C 1/002; C02F 3/344; C02F 3/226
(Continued)

(56) References Cited

U.S. PATENT DOCUMENTS 3,941,692 A    3/1976  Gutnick et al.
3,959,127 A    5/1976  Bartha et al.
(Continued)

FOREIGN PATENT DOCUMENTS

AU       7802994 A    4/1995
CA     1 263 327 A    11/1989
(Continued)

*Primary Examiner* — Claire A Norris
(74) *Attorney, Agent, or Firm* — Vorys, Sater, Seymour & Pease LLP (57) ABSTRACT

Provided is a method of bioremediation of organic contaminated water within an annulus of an oil lubricated shaft, the method includes: (a) introducing into the annulus of said oil lubricated shaft an amount of a bioremediation combination including (i) a microbial cocktail capable of biodegrading the organic contaminants and (ii) nitrogen source, such that said bioremediation combination is brought into contact with water suspected of being contaminated in said annulus; and (b) supply into said annulus oxygen source for a time sufficient for biodegradation of at least a portion of said organic contaminants in the water within the annulus.

16 Claims, 5 Drawing Sheets

(51) Int. Cl.
*C02F 101/32* (2006.01)
*C02F 103/10* (2006.01)

(58) Field of Classification Search
USPC .................. 166/246, 304, 312; 210/922, 611
See application file for complete search history.

(56) References Cited

U.S. PATENT DOCUMENTS

| | | | |
|---|---|---|---|
| 5,780,290 | A | 7/1998 | Rosenberg et al. |
| 6,872,318 | B2 * | 3/2005 | Kerfoot .............. B01F 3/04262 |
| | | | 210/747.8 |
| 7,681,638 | B2 | 3/2010 | Soni et al. |
| 2009/0025931 | A1 * | 1/2009 | Soni ....................... C09K 8/524 |
| | | | 166/246 |
| 2009/0321350 | A1 * | 12/2009 | Nelson ..................... C02F 3/34 |
| | | | 210/610 |
| 2012/0261117 | A1 * | 10/2012 | Pavia ..................... C09K 8/582 |
| | | | 166/246 |
| 2014/0144838 | A1 * | 5/2014 | Kumar ................... C02F 3/341 |
| | | | 210/616 |

FOREIGN PATENT DOCUMENTS

| | | | | |
|---|---|---|---|---|
| CA | 2 018 621 | A1 | 12/1990 | |
| WO | 99/05392 | A1 | 2/1999 | |
| WO | 2004/094316 | A2 | 11/2004 | |
| WO | WO-2004094316 | A2 * | 11/2004 | ............. B09C 1/002 |
| WO | 2007/093993 | A2 | 8/2007 | |

\* cited by examiner

METHOD FOR BIOREMEDIATION OF CONTAMINATED WATER

TECHNOLOGICAL FIELD

The present disclosure relates to water treatment and specifically to methods of bioremediation of organic contaminants in deep water.

BACKGROUND ART

References considered to be relevant as background to the presently disclosed subject matter are listed below:
U.S. Pat. No. 3,941,692
U.S. Pat. No. 5,780,290
International Patent Application publication No. WO2004/094316
International Patent Application publication No. WO2007/093993.

Acknowledgement of the above references herein is not to be inferred as meaning that these are in any way relevant to the patentability of the presently disclosed subject matter.

BACKGROUND

Treatment of organic contaminations in water can be done by different methods. For example, use of different types of bacteria to biodegrade organic contaminations in water was described in the following publications.

U.S. Pat. No. 3,941,692 which describes a process for removing oil from sea water in ship compartments using a microbial organism, a source of nitrogen and a source of phosphorus and.

U.S. Pat. No. 5,780,290 which describes bioremediation of hydrocarbons.

International Patent Application WO2004/094316 which describes bioremediation of petroleum using uric acid.

International Patent Application WO2007/093993 which describes bacterial compositions useful for treating contaminated water and surfaces.

GENERAL DESCRIPTION

The present disclosure provides a method of bioremediation of organic contaminated water within an annulus of an oil lubricated shaft, the method comprises:
  introducing into the annulus of the oil lubricated shaft an amount of a bioremediation combination comprising (i) a microbial cocktail capable of biodegrading the organic contaminants and (ii) nitrogen source, such that said bioremediation combination is brought into contact with water suspected of being contaminated in said annulus;
  supply into said annulus oxygen source for a time sufficient for biodegradation of at least a portion of said organic contaminants in the water within the annulus.

In some embodiments, the bioremediation combination comprises a phosphate source.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

In deep water drilling wells the use of vertical pumping equipment typically results in contamination of the water in the well from the lubricating oils, such as white paraffin oil that tend to penetrate/leak into the water well from the pump. The leaked oil accumulates on the surface of the water. Not only the oil contaminates the water, but also may serve as a carbon source for contaminating bacterial growth.

As part of preventative maintenance of water wells, treatment protocols are carried out to remove paraffin oil from the wells to which it has leaked. For example, oil spills may be removed by dismantling the pumping equipment or by pumping of the oil matter only. Both these solutions require halting of the water pumping for performing the maintenance procedure.

The present disclosure is aimed at providing a biological solution for the removal of oil spills forming organic contaminants, which is particularly suitable for treatment of organic contaminants found in deep water wells that otherwise typically require complicated equipment or procedures. As will be evident from the description herein, the solution subject of the present disclosure can be performed while the water pumping continues. As such, the present disclosure provides an improved solution for remediation and specifically bioremediation of oil contaminants within deep water.

Specifically, the present disclosure is based on the development of a system and method for removal/degradation of organic contaminations, such as the paraffin oil, found within annulus of oil lubricated shafts of water pumping equipment. A unique feature of the system and method disclosed herein resides in the fact that the treatment is conducted in deep water, even at depths of 100 meters below ground level, and even at depth of 1,000 meters below ground level. The treatment is based on the use of microbial cocktail that is introduced together with nitrogen source and essentially continuous oxygen supply into the annulus of the oil lubricated shaft.

Thus, in accordance with its broadest scope, the present disclosure provides a method for bioremediation of organic contaminants in water within an annulus of an oil lubricated shaft, the method comprises:
  introducing into the annulus of said oil lubricated shaft an amount of a bioremediation combination comprising (i) a microbial cocktail capable of biodegrading organic matter and (ii) nitrogen source, such that said remediation combination is brought into contact with water suspected of being contaminated in said annulus;

supply oxygen source into said annulus for a time sufficient for biodegradation of at least a portion of said organic contaminants in the water within the annulus.

As further defined below the term "bioremediation" refers to biological treatment of water which reduces and/or eliminates organic contaminants in water and specifically in deep water. As further described herein below, the term "bioremediation combination" refers to a combination comprising at least a biological component such as at least microbial cocktail as further described herein below.

The present disclosure is particularly aimed at reaching and treating contaminated deep water confined in a restricted and isolated environment within annulus of an oil lubricated line shaft pump. This treatment is achieved by the combination of a microbial cocktail and at least one of a nitrogen source, a phosphate source, carbon source and oxygen source such that at least paraffin oil is biodegraded. As appreciated, at the onset of the operation of water pump used to obtain water from the well and/or during continuous operation of the pump, oil that is being used to lubricate the bearings, may penetrate through the water pumping system and into the water circulation and thereby accumulate on the surface of the water within the well. This, in turn, may cause contamination in water reaching ground level, consumers and pools. As such, penetration and accumulation of oil is a major drawback that affects the water produced by the wells as well as the operation and reliability of the pumping system.

In some embodiments, the bioremediation treatment disclosed herein is for treating contaminated water captured within vertical pumps also known as line shaft pumps. Line shaft pumps have at least a motor located on the wellhead and a line shaft running down the discharge column pipe to the pump. The shaft is supported by line shaft bearings that center and stabilize the shaft in the column pipe. The line shaft bearings need to be lubricated during pumping (namely, operation of the pump) for example by using water to lubricate the bearings or by an oil-lubricated system.

Figure 1:
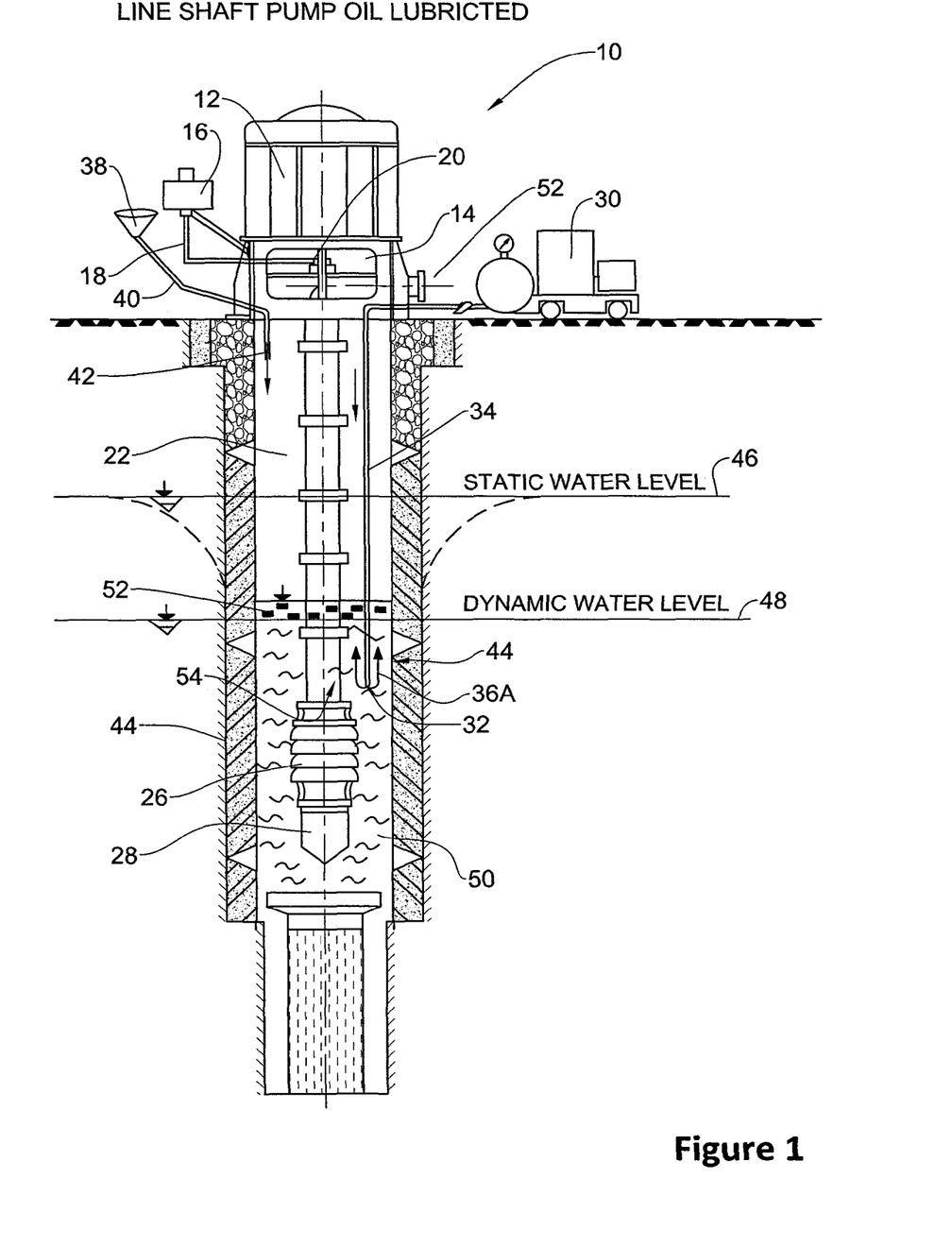
FIG. 1 provides a schematic illustration of a bioremediation apparatus at a water drilling site, in accordance with some embodiments of the present disclosure.

To better understand the present disclosure, reference is made to FIG. 1 providing a schematic and non-limiting illustration of a vertical pump and its components, including elements required for performing the method disclosed herein.

Specifically, FIG. 1 provides a non-limiting illustration of a vertical, deep water pumping system 10 comprising a motor 12, a shaft motor 20, a discharge head 14, a lubricating oil tank 16 with its oil lubricating delivery conduit/pipe 18 having an outlet 52 for lubricating the pump's annulus 22 upon need. Also illustrated is shaft 22, extending from shaft motor 12 and having at its distal end water pump 26. The pumping system also includes a suction strainer 28 for sucking water to annulus 22.

FIG. 1 also illustrates an air compressor 30 for introducing air below water level in the pumping system, via outlet 32 of air delivery conduit/pipe 34 that is submerged in the water zone 50, as illustrated by arrows 36A.

In addition, pumping system 10 includes remediation combination/reagent feeding funnel 38 and delivery conduit/feeding pipe 40, respectively for feeding, via feeding outlet 42 the remediation combination.

Air delivery pipe 34 and remediation feeding pipe 40 may be of any conventional material. In some embodiments, the pipes are plastic, such as Pexgol pipes which are polyethylene cross linked pipes. The diameter of the pipes should be sufficient to allow smooth flow of the fluids introduced there through. In some other embodiments, the pipes, such as pipes 34 and 40 may be stainless steel pipes. In some further embodiments, the pipes may be galvanized pipes. In some further embodiments, the galvanized pipes may be coated with extrude polyethylene.

In some embodiments, the diameter of the pipes is between 20 mm to 80 mm. In some other embodiments, the pipes have a diameter of about 40 mm to about 60 mm. In some further embodiments, the pipes have a diameter of about 50 mm.

Notably, while FIG. 1 illustrates feeding pipe 40 as the sole deliver form for introducing the remediation combination, the system may include more than one feeding pipe, to allow, for example simultaneous addition of all components of the remediation combination. The bioremediation combination components may be introduced simultaneously, or in sequence. When introduced in sequence, the delivery conduit, such as pipe 40 may be washed with water, so as to wash down any residual matter that may have adhered to the walls of the pipe.

Finally, pumping system 10 comprises a casing 44 for protecting the pump components. In some embodiments, casing 44 has a diameter of about 8" to about 20". Casing 44 may be introduced to various depths, depending on the desired depth of the well. In the examples provided herein, the casing was introduced into a depth of about 150-450 m below ground level.

Also illustrated in FIG. 1 are water static level 46 and water dynamic level 48 provided once the pumping system 10 is within a water well, water zone 50 and contaminating oil layer 52, when such contamination indeed exists. Oil typically leaks as illustrated by arrows 54.

The pumping system as that illustrated in FIG. 1 are typically used for deep water drilling from deep water wells. Water wells are considered as an excavation or structure created in the ground by digging, driving, boring, or drilling to access groundwater in underground aquifers.

In some embodiments, the water pumps are installed at water wells to a depth of at least 40 meter below ground level. In some other embodiments, the depth is 100 meter below ground level. In some other embodiments, the depth is 400 meter below ground level. In yet some other embodiments, the depth is 800 meter below ground level. Further, in some embodiments, the depth is even 1000 meter below ground level, or even 1500 meter below ground level.

The present disclosure provides an unexpected solution for treating organic contaminants at such depths, without the need to disseminate the pumping system and halting the pumping operation. It was unexpectedly found that even while still in operation, any organic contaminants, such as leaked lubricating oil may be decomposed (biodegrade) and eliminated by treatment with a combination of reagents firstly disclosed herein.

Specifically, it has been found that applying bioremediation combination into the annulus of the pumping system and essentially continuous supply of oxygen causes biodegradation of the organic contaminants.

As used herein the term "organic contaminants" refer to any hydrocarbon containing matter that under acceptable regulations is considered a water contaminant, i.e. its presence in the water is undesired.

In some embodiments, the organic contaminants comprise oil contaminations. In some other embodiments, the organic contaminants are oil contaminations. In some embodiments, the organic contaminants comprise lubricating oils. In accordance with the present disclosure, the organic contaminants results in part from the use of lubricated oil during operation of the system used to obtain water from the well.

When referring to lubricating oil it is to be understood as encompassing at least any oil introduced to mechanical equipment to reduce friction between moving parts of the system. The lubricating oil according with the present disclosure may comprise any impurities such as oil impurities found in lubricating oil such as for example engine oil or grease.

A lubricant may be characterized by at least one of the following characteristics: high boiling point, low freezing point, high viscosity index, thermal stability, hydraulic stability, demulsibility, corrosion prevention or high resistance to oxidation. In some embodiment, the lubricating oil is selected from the group consisting of paraffin oil.

When referring to "paraffin oil" it is to be understood as having its meaning known in the art, namely, mineral oil, white oil, liquid paraffin, pariffinum liquidum, liquid petroleum, kerosene or stove oil and including any of the three basic classes of paraffin oils: (i) paraffinic oils, based on n-alkanes, (ii) naphthenic oils, based on cycloalanes and (iii) aromatic oils, based on aromatic hydrocarbons.

The term paraffin oil refers to paraffin oil and any degradation product thereof. In some embodiments, the term paraffin oil refers to hydrocarbon fractions of $C_{19}$, $C_{20}$ and $C_{25}$ and carbonic gas.

In some embodiments, the oil contaminant is at least paraffin oil. In some other embodiments, the oil contaminate comprise microorganism. In some further embodiment, the microorganism comprise coliform. The degree or amount of microorganism contaminant may be determined using any conventional method known in the field, for example using total bacteria count.

The organic contaminants in the context of the present disclosure are those that accumulate within the annulus of the pumping system, for example on the surface of the water forming or constituting a contaminant layer or contaminated zone. Without being bound by theory, the contaminant layer or contaminated zone and the water form two phases, an organic phase and an aqueous phase with the organic phase present on top of an aqueous phase.

Depending on the depth of the water within the pumping system, the organic contaminants may accumulate at depths of 100 meters below ground level or even deeper, e.g. 200 meters, at times 300 meters, 500 meters, 700 meters, 900 meters, 1100 meters, 1300 meters, and even 1500 meters below ground level. The amount of contamination may be defined by the diameter of the circular casing (defining the diameter of the contaminant layer) and the thickness of the contaminant layer. The thickness of the layer may vary from several centimeters (low contamination) to several, ten or even tens of meters. As appreciated, being deep below surface level, the contaminated zone is in confined area that has little or no accessibility to air.

The term "water suspected of being contaminated" refers to water that may be contaminated and as such may be further subjected to bioremediation as described herein. The water may be suspected to be contaminated based on different reasons, for example water treatment protocol such as prior treatment(s) of water and/or the time period from such treatment if occurred and/or any measured parameter that reflect the water quality (contaminations), for example those described herein below for determining contamination in water and specifically organic contamination in water. It should be noted that the water may be suspected of being contaminated based on a decision made by a skilled person, possibly without measuring the water quality.

The amount or degree of contamination may be determined by various techniques known in the art. These may include chemical analysis, such as total organic carbon (TOC) count or oil and grease (O&G), imaging using any conventional digital camera system (DCS), or physical measurements, e.g. of the water depth below oil layer using water level gauge pipes.

Treatment in accordance with the present disclosure may be performed at any degree of contamination, i.e. at any contaminant thickness. At times, treatment takes place only if the level of the organic contaminations is determined to be above a predetermined threshold. In some embodiments, the predetermined threshold is 300 µg/l.

Once it is determined that treatment is required, the annulus of the pumping system is fed with the bioremediation combination disclosed herein.

The bioremediation combination comprises at least a microbial cocktail. In some other embodiments, the bioremediation combination comprises a microbial cocktail and a nitrogen source.

In some embodiments, the bioremediation combination includes the following combination:

A microbial cocktail including any one of bacteria, fungi and algae capable of metabolizing organic matter. When referring to a cocktail, it is to be understood to include at least one type of microorganism that is capable of consuming, biodegrading or otherwise eliminating organic matter and specifically organic contamination in the water.

In some embodiments, the microbial cocktail includes at least one type of bacteria. In some other embodiments, the microbial cocktail includes a combination of at least two bacteria. When referring to one type of bacteria it should be understood as referring to one species as classified under common scientific classification.

Needless to say, for the purpose of the disclosed method, all members of the microbial cocktail are environmentally friendly and non-pathogenic.

In some embodiments, the microbial cocktail comprises at least aerobic bacteria.

In some embodiments, the microbial cocktail comprises microorganisms isolated from water. In some embodiments, the microorganisms are isolated from deep water wells.

Without being bound by theory, the inventors have suggested that the microorganisms may be present at the interface between the water layer (phase) and the organic layer (phase). In some embodiments, the microbial cocktail comprises microorganisms isolated from the interface between the water layer and the organic layer.

In some embodiments, the microbial cocktail comprises at least one bacterial species (type) from the *Bacillus* genus, *Delftia* genus, *Leucobacter* genus, *Novosphingobium* genus, *Ochrobactrum* genus, *Rhizobium* genus and *Sphingobacterium* genus.

In some embodiments, the microbial cocktail comprises at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

*Bacillus thuringiensis* (or Bt) refers to a gram-positive, soil-dwelling bacterium, commonly used as a biological alternative to a pesticide.

*Delftia tsuruhatensis* refers to a Gram-negative, short rod-shaped, terephthalate-assimilating bacterium.

*Leucobacter alluvii* refers to a gram-positive non-motile rod-shape cells.

*Novosphingobium panipatense* refers to gram-negative, halophilic microorganism.

*Ochrobactrum intermedium* refers to gram-negative short rods.

*Rhizobium cellulosilyticum* refers to gram-negative rods.

*Sphingobacterium daejeonense* refers to a gram-negative aerobic, rod-shaped, non-motile, non-spore-forming bacteria.

In some embodiments, a common feature to the bacteria in the cocktail is that all can grow on paraffin oil. In some other embodiments, a common feature to the bacteria in the cocktail is that all can grow on paraffin oil as the soil carbon source.

In addition, and in accordance with yet some other embodiments, a common feature of the bacteria in the cocktail is that all can grow on uric acid as the sole carbon and nitrogen source In some embodiments, the cocktail comprises the same or equivalent amounts of the bacteria forming the cocktail.

In some further embodiments, the cocktail comprises different amounts of the bacteria forming the cocktail.

In some embodiments, the microbial cocktail comprises *Bacillus thuringiensis*.

In some other embodiments, the microbial cocktail comprises *Delftia tsuruhatensis*.

In some other embodiments, the microbial cocktail comprises *Leucobacter alluvii*.

In some other embodiments, the microbial cocktail comprises *Novosphingobium panipatense*.

In some other embodiments, the microbial cocktail comprises *Ochrobactrum intermedium*.

In some other embodiments, the microbial cocktail comprises *Rhizobium cellulosilyticum*.

In some other embodiments, the microbial cocktail comprises *Sphingobacterium daejeonense*.

In some embodiments, the microbial cocktail comprises one microorganism, or bacteria as identified above.

In some embodiments, the microbial cocktail comprises a combination of two, three, four, five, six or seven microorganisms, or bacteria as identified above.

The microbial organism forming the microbial cocktail may be isolated from the well to be treated, from another well identified as being contaminated, or from commercially available sources, the microorganism being a priori identified as being capable of either biodegrading at least one of crude oil, paraffin oil, or being capable of growing on uric acid as the sole carbon and nitrogen source.

In some embodiments, the bacteria are isolated from the contaminated site. In some other embodiments, the bacteria are isolated from an interface between water layer and organic layer.

The microbial cocktail may be isolated, enriched and analyzed by any method known in the art. Non-limiting examples include growing on standard growth medium R2A agar (Reasoner's 2A agar).

As also detailed in the Examples herein, the isolated bacteria may be characterized by determining colony morphology, specific bacterial staining, biochemical tests and sequencing of the gene coding for the 16S RNA In the context of the present disclosure, identification of bacteria may be done using any conventional method in the microbiology field. For example and without being limited thereto identification of bacteria may be done using 16S rRNA sequencing.

As described in the Examples herein below, identification of isolated bacteria was done by conducting similarity analysis between the 16S rRNA gene of the isolated bacteria to different bacteria's 16S rRNA gene sequences available in database. This similarity analysis was done in order to explore the similarity between a given sequence and all of the available sequences in a database and obtaining the best matched sequences by calculation of a score for the examined similarity.

Similarly analysis may be conducted by any appropriate program, for example Basic Local Alignment Search Tool (BLAST®) using publically available databases, for example National Center for Biotechnology Information (NCBI).

In some embodiments, the microbial cocktail comprises at least one of bacteria identified as having a highest score (top score) in a similarity analysis corresponding to at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

In some embodiments, the microbial cocktail comprises at least one of bacteria identified as having a second highest score in a similarity analysis corresponding to at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

In some embodiments, the microbial cocktail comprises at least one of bacteria identified as having a third highest score in a similarity analysis corresponding to at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

In some embodiments, the microbial cocktail comprises at least one of bacteria identified as having a score within the highest five or ten top scores in a similarity analysis corresponding to at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

Without being bound by theory, it is believed that since most equipment make use of the same or similar lubricating oil, the microbial cocktail required for its decomposition would be the same, irrespective of where the original bacteria has been isolated from. Thus, in some embodiments, the microbial cocktail is one a priori prepared.

In some embodiments, the composition of the cocktail, namely, the types of microorganisms included, the ratio between the microorganisms, may be adapted based on the level of contamination in the well. For example, prior to treatment, assessment of the contamination level and in situ presence of the microorganism forming the cocktail. For example, prior to treatment analysis of bacteria presence in the water to be treated may reveal that there is a need of excess of one type of bacterial strain over another typically present in the cocktail. Thus, prior to performing the bioremediation process, the composition of the cocktail may be adapted according to the particular well's needs.

In some embodiments, the cocktail comprises essentially equal counts of each microorganism forming the cocktail. In some embodiments, the total number (cell count/amount) of microorganisms forming the cocktail and being introduced into the well is between about $10^6$ to about $10^{17}$ cells. In some other embodiments, the total number is between about $10^8$ to about $10^{15}$. In yet some other embodiments, the total count is between about $10^{10}$ to about $10^{15}$.

In some embodiments, the total amount indicated above refers to a total count of a microbial cocktail comprising at least one of *Bacillus thuringiensis, Delftia tsuruhatensis, Leucobacter alluvii, Novosphingobium panipatense, Ochro-*

*bactrum intermedium, Rhizobium cellulosilyticum* and *Sphingobacterium daejeonense.*

In some embodiments, the microbial cocktail can be introduced to the contaminated site if at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense* is not present at the contaminated site.

In some embodiments, the microbial cocktail can be introduced to the contaminated site if at least one of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense* is not present in sufficient quantities at the contaminated site.

In some embodiments, the microbial cocktail can be introduced in dry form, for example, as a lyophilized powder, in gel form or as a suspension. In some other embodiments, the microbial cocktail is maintained in glycerol at a temperature of about −80° C. and introduced as a suspension.

The microbial cocktail may be introduced several times, namely multiple treatments. In some embodiments, the microbial cocktail is introduced once for performing the method disclosed herein. In some other embodiments, the microbial cocktail is introduced at least twice during treatment. In some other embodiments, the microbial cocktail is introduced at least three times during treatment.

As described herein, microbial cocktail may be introduced upon need (namely a change in at least one of the measured parameters) or according to pre-scheduled time lines. As described above, the suspected water may be treated upon need, according to a treatment protocol or according to a decision made by those versed in the field. The amount of the microbial cocktail may be the same or different when applied several times. The amount of the microbial cocktail to be added may be determined based on the water quality measurements.

The addition of a further amount (one or more) of the microbial cocktail may be in combination with the at least nitrogen source and/or phosphate source. The addition of a further amount of nitrogen source and/or phosphate source may be together, before or after the addition of the further amount(s) of the cocktail.

Figure 5:
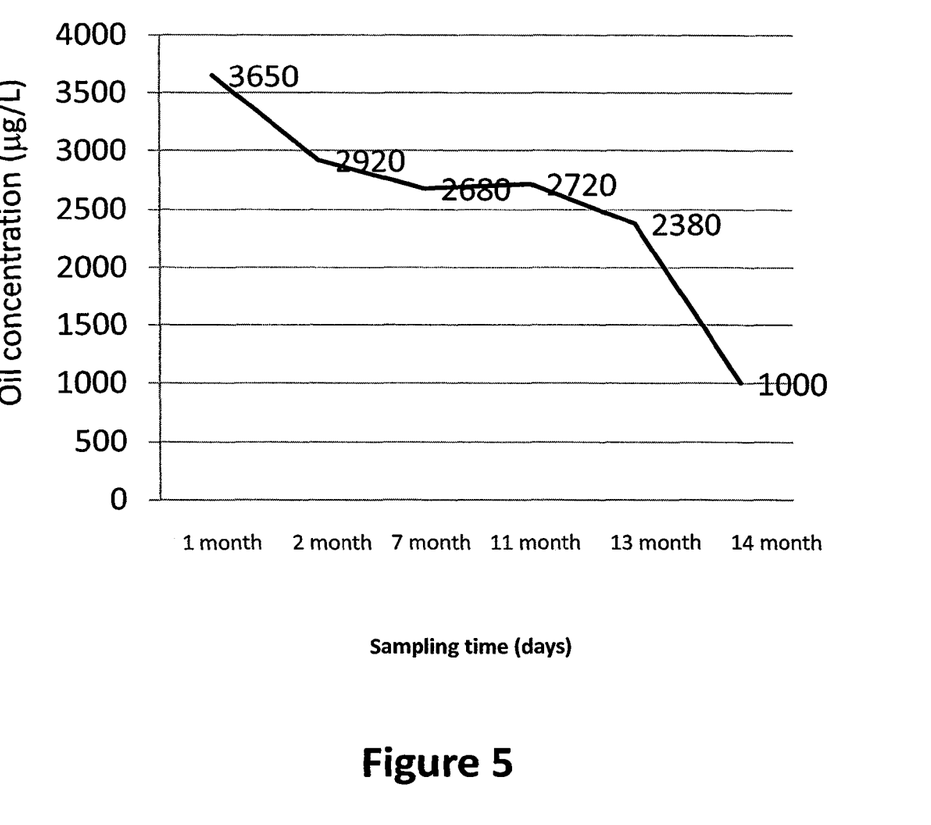
FIG. 5 is a graph showing concentration of oil in water samples obtained from the drilling well in Ein Kerem after the second bioremediation treatment and third bioremediation treatment.

As shown in Table 4 and FIG. 5, multiple introductions of microbial cocktail were found to be effective in treating water and maintaining the water quality.

Notably, while the microorganism may use the paraffin oil as a hydrocarbon source, the degradation requires a source of nitrogen, which cannot be provided by the oil itself. Thus, the availability of nitrogen may be considered as a rate-limiting step in bacterial paraffin oil degradation. To this end, a nitrogen source also forms part of the bioremediation combination and is to be added along with (before, after or concomitantly) the microbial cocktail.

The amount of nitrogen source to be added may be determined based on the amount of organic contamination found in the contaminated site.

In some embodiments, the bioremediation combination comprises at least uric acid. Many different species of bacteria are known to consume uric acid as the source of carbon, nitrogen and energy.

In some embodiments, uric acid may be added as a powder. In some further embodiments, the powder uric acid is a priori mixed with water to form a suspension. The water may be fresh water or water from the well.

As noted above, the amount of nitrogen source may vary. In some embodiments, when the nitrogen source comprises uric acid, the matter may be added in an amount from about 1 kilogram to about 30 kilograms of uric acid per single addition of bioremediation combination into the well. In some other embodiments, the bioremediation combination comprises about 5 kilogram to about 20 kilograms of uric acid. In some further embodiments, the bioremediation combination comprises about 8 kilogram to about 14 kilograms of uric acid.

In some embodiments, the nitrogen source comprises ammonium salt(s). Non limiting examples of ammonium salts comprise ammonium phosphate, ammonium carbonate, ammonium chloride, ammonium nitrate, ammonium acetate, ammonium bromide. The bioremediation combination may comprise one, two, three, four or any other combination of ammonium salts. In accordance with some embodiments, a single type of ammonium salt is used. In some other embodiments, two or more are used.

Further, the degradation requires a source of phosphate, which cannot be provided by the oil itself. To this end, a phosphate source may also form part of the bioremediation combination and is to be added along with (before, after or concomitantly) the microbial cocktail. In addition, the phosphate source can be added along with (before, after or concomitantly) the nitrogen source.

The amount of phosphate source to be added may be determined based on the amount of organic contamination found in the contaminated site.

In some embodiments, the phosphate source may be added as a powder. In some further embodiments, the powder phosphate source is a priori mixed with water to form a suspension. The water may be fresh water or water from the well.

In some embodiments, the phosphate source comprises at least a phosphate salt(s).

In accordance with some embodiments, a single type of phosphate salt is used. In some other embodiments, two or more are used.

Non-limiting examples of phosphate salt include sodium phosphate, calcium phosphate, magnesium phosphate, potassium phosphate, rubidium phosphate, caesium phosphate and ammonium phosphate.

In some embodiments, the phosphate salt is potassium phosphate. Potassium phosphate refers to salts of potassium and phosphate ions including: monopotassium phosphate ($KH_2PO_4$), dipotassium phosphate ($K_2HPO_4$), tripotassium phosphate ($K_3PO_4$).

In some embodiments, at least one of monopotassium phosphate, dipotassium phosphate and tripotassium phosphate is used as the phosphate salt. In some other embodiments, a combination of at least two of monopotassium phosphate, dipotassium phosphate and tripotassium phosphate is used. In some further embodiments, a combination of monopotassium phosphate, dipotassium phosphate and tripotassium phosphate is used.

In some embodiments, the phosphate salt is ammonium phosphate. In some other embodiments, the phosphate salt is selected from monoammonium phosphate (also known as ammonium dihydrogen phosphate) and diammonium phosphate (also known as diammonium hydrogen phosphate). In some embodiments, the only diammonium phosphate is used as the phosphate salt. In some other embodiments, a combination of monoammonium phosphate and diammonium phosphate is used.

The amount of phosphate salt used may also vary, depending on various factors, such as the level of contamination, the amount of microbial cocktail (cell count) etc. In some embodiments, phosphate salt is added in a total amount of between about 0.5 kilogram to about 6 kilograms, at times in an amount of between about 1 kilogram to about 5 kilograms.

The nitrogen source and/or the phosphate source may be water soluble, slightly water soluble or water insoluble. In some embodiments, the nitrogen source and/or the phosphate source may be slightly water soluble or water insoluble In some embodiments, the ratio between the carbon source:nitrogen source:phosphate source is between about 10:1:1 to about 1:1:1. In some embodiments, the ratio between the carbon source:nitrogen source:phosphate source is between about 7:1:1 to about 3:1:1.

The bioremediation method disclosed herein also requires supply of oxygen. The supply of oxygen may be in batches, but is preferably an essentially continuous supply of oxygen source. In some embodiments, the oxygen source is any one selected from the group consisting of gaseous oxygen ($O_2$), air containing oxygen or any other gaseous fluid containing high concentrations of oxygen, e.g. water saturated with dissolved oxygen.

In some embodiments, the oxygen is air provided by a conventional air compressor that allows the introduction of the oxygen into the water to be treated with pressure, to cause high turbulence and efficient mixing of the oxygen in the water.

In some embodiments, the oxygen source is introduced into the water by jets, injecting the oxygen source into the water. In some other embodiments, the oxygen is introduced by microjets forming bubbles (bubbling) that aerate the water, venturi tube, cascade aeration, oxidation tower, fine bubble aeration etc.

In some embodiments, the oxygen source is introduced into the water at least 10 meter below the dynamic water level. In some further embodiments, the oxygen source is introduced into the water and allowed to diffuse into the interface between the water layer and organic layer.

The mixing of the oxygen source with the water provides oxygen-rich water, i.e. water which is rich with dissolved oxygen (DO). The term "oxygen rich water" used herein denotes water comprising high levels of DO (close to or at maximal saturation). In some embodiments, the level of oxygen in the water may be defined by % saturation, being between about 10% to about 100%.

In some embodiments, contacting the oxygen source with the water to be treated is to an extent to provide an amount of oxygen in the water which would constitute about 10% v/v of its maximal saturation in fluid, at times, 20%, 30%, 40% or 50%, and even at times, up to 75% or 100% saturation. In some embodiments, the level of saturation of the oxygen fluid and the water being mixed is between 10%-90% of maximal saturation, at times, 30%-80%, at times, 40%-90% and further at times, 50%-90%. According with some embodiments, the level of saturation of the oxygen fluid and the water being mixed corresponds to a saturation level obtained using a condenser at a flow rate of between about 100 L/min to about 600 L/min, at times between about 300 L/min to about 500 L/min. According with some further embodiments, the level of saturation of the oxygen fluid and the water being mixed corresponds to a saturation level obtained using a condenser at a flow rate of about 400 L/min.

Oxygen is introduced to the site in an amount sufficient to stimulate growth of the required oil-consuming bacteria. In some embodiments, the concentration, rate and time of oxygen introduced into the contaminated water may be determined based on the presence (amount) or absence of the microbial population present at the site As described herein, the bioremediation combination is brought into contact with the water suspected of being contaminated. The term "contact" refers to bring, put or mix together and should be understood such that the bioremediation combination and the water possibly comprising organic contaminants interact, in other words, the bioremediation combination and the water possibly comprising organic contaminants are in a proximity that allows interaction (touching, physical touching) such that a reaction may take place. It should be noted that in case organic contaminants are present in the water, the term contact refers to an interaction between the bioremediation combination and at least part of the organic contaminants. Oxygen is supplied to allow the organic contaminants to be degraded and consumed by the bacteria to cause the bioremediation of organic matter in the well.

Bioremediation thus denotes any change, reduction in the amount or organic matter in the well as a result of at least a single addition of the bioremediation combination, in the presence of oxygen, compared to the initial level of the contaminant prior to the same treatment.

As described herein, the oxygen source is supplied for a time sufficient to allow bioremediation and specifically bioremediation of a portion of the organic contaminants. The time sufficient as used herein refers to a time period that allows bioremediation. The time period may be set according to a pre-schedule time lines and/or upon need, namely change measured in at least one parameter, for example oil amount, during operation and/or based on a decision made during well operation. A skilled person would know to determine the time sufficient for supplying an oxygen source as described above. The time is sufficient to biodegrade at least 10% of said organic contamination, at times at lat least 25%, at times by at least 30%, or by at least 40%, at times by at least 50%, at least 70%, at times by at least 80%, by at least 85%, at times by at least 90%, at times even by at least 95%, as compared to its amount prior to treatment as determined by at least one chemical In some embodiments, the oxygen is supplied as described above for a time sufficient for bioremediation of at least a portion of the organic contaminants. A portion of the organic contaminants denotes part and/or percentage of the contamination as measured at the sufficient time and/or at any time point after the sufficient time, relative to the initial measurement. In other words, the part/portion may be understood as the reduction in the initial concentration (amount) prior to treatment or any predetermined value.

The portion of the contaminants may be a number set according to a predetermined threshold reflecting, for example a change in at least one parameter (for example oil amount) and/or set according to a decision made during well operation. The portion of the organic contaminants may be denoted by a threshold value for at least one measured parameter or by a % reduction of at least one measured parameter as described herein. In some embodiments, bioremediation of organic matter denotes a reduction in the initial concentration (amount) prior to treatment of the organic matter and/or at least one measured parameter as described herein. It should be appreciated that the term "reduction" as referred to herein, relate to the reduction by any one of about 1% to 99.9%, specifically, about 1% to about 5%, about 5% to 10%, about 10% to 15%, about 15% to 20%, about 20% to 25%, about 25% to 30%, about 30% to 35%, about 35% to 40%, about 40% to 45%, about 45% to 50%, about 50% to 55%, about 55% to 60%, about 60% to 65%, about 65% to 70%, about 75% to 80%, about 80% to 85% about 85% to 90%, about 90% to 95%, about 95% to 99%, or about 99% to 99.9%.

In some embodiments, bioremediation of organic matter refers to a reduction in the initial concentration (amount) prior to treatment of the organic matter and/or at least one measured parameter as described herein by at least 10%, at times by at least 25%, at times by at least 30%, or by at least 40%, at times by at least 50%, at least 70%, at times by at least 80%, by at least 85%, at times by at least 90%, at times even by at least 95%, as compared to its amount prior to treatment as determined by at least one chemical and/or microbial assay, as listed herein below. At times, no detectable amount of organic contaminants is present in a water sample from the treated well after undergoing the process disclosed herein.

When referring to reduced amount or no detectable amount as a result of performing the method disclosed herein, is should be understood as referring to an amount (level/concentration) determined by any bacteriological analysis assays, such as total bacterial count, microbial indicators such as Coliform, *Streptococcus faecalis* and Fecal Coliform or *Pseudomonas aeruginosa* count; and/or by a chemical analysis techniques such as Kjeldahl analysis (nitrogen analysis), ammonia ($NH_4$)—by ion selective electrode, total organic carbon (TOC) count, oil concentration—measured for example by FTIR-partition infrared, nitrate, pH and dissolved oxygen (DO).

When referring to no detectable amount, it is to be understood as an amount below a threshold level of a measuring device or kit or below a level considered by acceptable regulation authorities as an acceptable threshold to be considered a non-detectable or safe amount. For example, an acceptable threshold for organic contaminations as determined by TOC assay is 0.2 mg/L.

In operation, the bioremediation combination is introduced at least once into the well while the water in the well is being continuously (or essentially continuously) supplied with oxygen source. Uniquely, the addition of the remediation combination and the supply of oxygen source do not require halting of the operation of the pump.

Surprisingly, as also shown in the non-limiting examples provided herein, after already 30 days from a single remediation treatment a significant amount of organic contaminants, as determined by at least one bacteriological and/or chemical analysis conducted, was reduced. Continuous sampling of the water allows the monitoring and control of the water quality and absence of contaminants after treatment. It has been found that the remediation method disclosed herein, even after a single treatment with the remediation combination maintained a clean well even after a period of 2, 3, 4, 5, 6, 7, 8, 9, 10, 11, 12 or more months, without the need of additional feeding of any component of the remediation combination.

The term "about" as used herein indicates values that may deviate up to 1%, more specifically 5%, more specifically 10%, more specifically 15%, and in some cases up to 20% higher or lower than the value referred to, the deviation range including integer values, and, if applicable, non-integer values as well, constituting a continuous range. As used herein the term "about" refers to ±10%. For example, when referring to the sampling day, is should be considered that the indicate day may be within the range of days calculations, for example about 1 month may be considered as 28 days, 30 days or 31 days.

The terms "comprises", "comprising", "includes", "including", "having" mean "including but not limited to". This term encompasses the terms "consisting of" and "consisting essentially of". The phrase "consisting essentially of" means that the combination method may include additional ingredients and/or steps, but only if the additional ingredients and/or steps do not materially alter the basic and novel characteristics of the claimed method. Throughout this specification and the Examples and claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

It should be noted that various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub ranges as well as individual numerical values within that range. For example, description of a range such as from 1 to 6 should be considered to have specifically disclosed sub ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Disclosed and described, it is to be understood that this invention is not limited to the particular examples, methods steps, and combinations disclosed herein as such methods steps and combinations may vary somewhat. It is also to be understood that the terminology used herein is used for the purpose of describing particular embodiments only and not intended to be limiting since the scope of the present invention will be limited only by the appended claims and equivalents thereof.

It must be noted that, as used in this specification and the appended claims, the singular forms "a", "an" and "the" include plural referents unless the content clearly dictates otherwise.

The invention will now be exemplified in the following description of experiments that were carried out in accordance with the invention. It is to be understood that these examples are intended to be in the nature of illustration rather than of limitation. Obviously, many modifications and variations of these examples are possible in light of the above teaching. It is therefore, to be understood that within the scope of the appended claims, the invention may be practiced otherwise, in a myriad of possible ways, than as specifically described hereinbelow.

DESCRIPTION OF SOME NON LIMITING EXAMPLES

Bacterial Cocktail

The bacterial cocktail was prepared from water samples taken from 100-400 meter deep pumping shafts. The samples were taken at different time points from those shafts suspected to contain paraffin oil contamination.

The samples were tested for their bacteria population immediately after collection or after storage at 4° C. up to 24 hours. Groups of bacteria were identified and tested.

The bacteria were tested for their ability to decompose oil such as paraffin oil.

Those bacteria that were capable of degrading paraffin oil were isolated, further cultured and characterized in the total bacteria count which was described above. The experimental data showed that the bacteria were capable of degrading at least 36% of the oil and even 67% (data not shown). The bacteria were identified in the interface between the water layer and the oil layer (above the water layer) (data not shown).

Other bacteria that are tested are the indicators bacteria that are found in the drinking water regulation: Total coliforms bacteria on mEndo Agar LES, Fecal coliforms on mFC agar, Fecal streptococcus on mEnterococcus agar and Pseudomonas aeruginosa on mPAC agar.

For the analysis, 100 ml sample were filtered through sterile membrane filters. Following the filtration each membrane was placed on a poured plate with the mentioned mediums and was incubated in specific temperature and period of time. After the incubation, every colony was counted.

The isolated bacteria were enriched by routine growth on R2A agar (Reasoner's 2A agar) under controlled conditions as previously described (E. W. Rice, R. B. Baired, A. D. Eaton and L. S. Clesceri, Standard Methods for the Examination of Water and Wastewater, 21st edition, APHA, AWWA, WEF, Chapter 9215). Briefly, a sample comprising bacteria was diluted poured on Agar medium and incubated for 44-48 hours at 35° C. Following the incubation the colonies were counted and characterized.

Characterization of the bacteria was performed by colony morphology, specific bacterial staining, biochemical tests and sequencing of the gene coding for the 16S RNA.

The isolated bacteria found to be useful for decomposition of paraffin oil were identified using the 16S rRNA sequences and Basic Local Alignment Search Tool (BLAST) to obtain the similar bacteria in a public data base. The homology indicated the isolated bacteria to be: Bacillus thuringiensis, Delftia tsuruhatensis, Leucobacter alluvii, Novosphingobium panipatense, Ochrobactrum intermedium, Rhizobium cellulosilyticum and Sphingobacterium daejeonense.

The isolated bacteria cocktail was found to be environmentally friendly and non-pathogenic. These bacteria were then combined into a bacterial bioremediation cocktail.

For use in the bioremediation assays, the conditions of degradation of the paraffin oil by the bacteria were optimized using uric acid and ammonium as further described below.

Bioremediation

All bioremediation assays were performed in oil contaminated shafts of water pumping equipments at different locations within Israel. The procedures were performed concomitant with continuous water pumping by the pumping equipment, such as that illustrated in FIG. 1. Water samples were taken from depths of at least 300 meter below ground level.

The results provided herein are derived from four different wells at different locations in Israel referred to herein as Oza-1 well, Ein Kerem well, Nahusha well and Revivim well. It should be noted that Ein Kerem well and Nahusha well are typically used to pump drinking water.

Materials:

In addition to the bacterial cocktail described above, uric acid, obtained from Sigma, and diammonium phosphate from Sigma was used as nitrogen source. Air was used as oxygen source.

System:

The system as illustrated in FIG. 1, described above, was used for the bioremediation assays.

Measurement of Oil Contaminants and Water Bioremediation:

All bioremediation assays were approved by the Israeli health authorities.

Samples from each location were routinely measured for biological and chemical contaminations. Oil contamination was measured by chemical analysis, photographic imaging, measuring the depth of water level.

Prior to bioremediation, static water level was measured. Then, an aqueous solution of about 10 kilograms of uric acid was added into the annulus of the shaft via pipe 36 in FIG. 1, followed by washing down the uric acid with water. Subsequently, an aqueous solution of about 2 kilograms diammonium phosphate was added via the same pipe 36 and washed down with water.

Through the same pipe, the bacterial cocktail was then added. Air was continuously introduced into the same water, albeit via pipe 30 in FIG. 1.

Results

Table 1 provides a summary of parameters from each tested site.

TABLE 1

Summary of data from the tested wells

| Parameter | Oza | Ein Kerem | Nahusha | Revivim |
|---|---|---|---|---|
| Static Level (meter) | 110 | 180 | 219 | 301 |
| Depth of shaft (meter) | 140 | 250 | 260 | 360 |
| Amount of oil before treatment (L) | 200 | 5,000 | 5,000 | 5,000 |
| Bacterial cocktail introduced during treatment (L) | 11 | 20 | 10 | 20 |

Analysis of Samples after Treatment

The success of the bioremediation method was analyzed using bacteriological and chemical analyses performed on water samples. The bacteriological counts were performed on samples of 100 ml, except for the total bacterial count on plate which may used of 1 ml sample.

Bacterial analysis included: total count, microbial indicators (Coliform, Streptococcus faecalis and Fecal Coliform) and Pseudomonas aeruginosa count.

Chemical analysis included: Kjeldahl analysis (nitrogen analysis), ammonia ($NH_4$), total organic carbon (TOC) count, oil concentration, nitrate, pH and dissolved oxygen (DO).

Water samples were obtained at different time points (sampling days) after initiation of treatment. At each sampling day, several water samples were obtained: at propulsion, namely at the onset of pump operation and at different time points after operation within the same day (for example 30 minutes, 60 minutes, 90 minutes, 120 minutes). The samples obtained at different time points within the same sampling day represent different stages in water pumping. At propulsion, the measurements represent mainly "standing" water and the amount of oil present in such water. The sample obtained after additional flow of water (i.e. 30 minutes, 60 minutes, 90 minutes, and 120 minutes) represent the water reaching to the consumer. The water samples obtained after 120 minutes or 90 minutes may closely mimic water reaching consumers after being drilled from well during pumping. Analysis of the samples at different time points in the same sampling day provides an overall representation of the water samples.

Water samples were obtained also during operation of the system (continuous operation).

Oza Well:

The Oza well was originally drilled in 1977, to a depth of 754 meters. The well is saline and supplies water for the irrigation of vineyards in the area around Moshav Oza. Over the years, lubricating oil pumps were operated in the well. During a malfunction, the lubricating oil pumping equipment was disassembled and images were taken. A temporary pump was installed at a depth of 140 meters (with a 160 mm Pexgol pipe). Two Pexgol level gauge pipes with a diameter of 50 mm and 32 mm were introduced at a depth of 105 meters and 140 meters, respectively. A pipe with a diameter of 18⅝" was introduced to protect the well (as a pump house or casting).

The static level in the temporary pump was 110 meters, with the height of the oil being 109/1 meters. The dynamic level (flow rate of 70 cm/h) was measured to be 112 meters.

Bacterial count and chemical analysis of the water at different time points before the bioremediation treatment of the well indicated that there are no contaminates in water including presence of oil in water.

In addition, images of the water level in the pipes at the different time points were taken, and these revealed an upper oil level at 109.1 m, and lower oil level at 114.2 m, namely, oil layer thickness of 5.1 meter inside the shaft.

While the chemical analysis revealed low amounts of oil, based on the images, it was decided to use the Oza well for bioremediation tests.

The testing was carried out as follows. For clarity, reference is made to components of the system as illustrated in FIG. 1.

Treatment:

Uric acid solution was prepared by dissolving 10 kg of powder uric acid in 20 L water. The uric acid solution was inserted into the pump shaft 22 through the 50 mm Pexgol pipe 40, into a depth of 105 meters, approx. 5 meters above the water static level.

Diammonium Phosphate solution, prepared by dissolving 2 Kg with 20 L water, was inserted into shaft 22 via the same 50 mm Pexgol pipe 40. Then, the pipe was washed to remove any residual material.

Air, as oxygen source, was continuously introduced to a depth of 140 m, via a 32 mm Pexgol pipe 34 using dedicated air compressors.

Finally, 11 L of bacterial cocktail ($10^9$-$10^{13}$ CFU/ml) was introduced via the 50 mm pipe 40.

Water samples were taken at different time points after treatment, and the samples were analyzed using bacteriological analysis results and chemical analysis as detailed above.

In addition, images of the water/oil level at 130 meter below ground level were taken. The results are presented in Table 2.

TABLE 2

Paraffin oil content based on image analysis.

| Date | Upper oil level | Lower Oil level | Paraffin oil (L)* |
|---|---|---|---|
| Before treatment | 109.1 | 114.2 | 850 |
| After treatment | 109.33 | | none |

*Volume of paraffin oil in layer thickness of 5.1 meter within pipes 18-5"/8" (inside diameter 460 mm)

The results from the images show that after thirty days of treatment, there was no evidence for the presence of paraffin oil on the water within the pumping shaft. Further, no buoyancy oil was observed.

Taken together, the results from Oza well showed that after about 30 days, 160 liters of oil were decomposed/degraded as evidence from the images.

Measurements of Coliform, *Pseudomonas* and total bacterial counts indicated elimination of bacteria from water.

Ein Kerem Well:

The Ein Kerem well ceased to be used as a source of drinking water due to the identification of paraffin contaminations in the well. The well, originally drilled in 1967 to a depth of 400 meters, included a pump installed at a depth of 250 meters (a 12" pump with 80 column pipes with a diameter of 10"). The pump included a protective tubing of 20".

The static water level was 180 m, and the dynamic water level (with a flow rate of 120 cmh) was 220 m. The amount of paraffin oil in the well was estimated to be 5,000 liters.

Bacteriological analysis and chemical analysis before treatment showed that the well is contaminated, as evident from the oil content (about 62,000 μg/ml), as well as the total bacteria count CFU (about 35,000 CFU/1 ml).

Treatment

In this site, treatment of water was done three times using the treatment protocol described below.

Uric acid solution was prepared as described above and inserted into the pump shaft 22 through the 50 mm Pexgol pipe 40, into a depth of 180 meters (the static level).

Diammonium Phosphate solution was as described above, and inserted into the same 50 mm Pexgol pipe 40. Then, the pipe was washed to remove any residual material.

Finally, 11 L of bacterial cocktail ($10^9$-$10^{13}$ CFU/ml) was introduced via the 50 mm pipe 40.

Air, as oxygen source, was continuously introduced to a depth of 140 m, via a 32 mm Pexgol pipe 34 using dedicated air compressors.

The compressors were tested during operation (compressors supply air to 2 points at a depth of 220 meters via air pipes with diameters of 6 mm and 8 mm which were inserted through 2" openings used for hydraulic rotation from the base of the well).

Water samples were taken at different time points after the treatments, and the samples were analyzed using bacteriological analysis and chemical analysis as detailed above.

Analysis of Samples after Treatment

Bacterial analysis was based on membrane filtration (MF) analysis in 100 ml sample, including Coliform membrane filtration (CMF), Fecal membrane filtration (FMF), *Strep. faecalis* membrane filtration (EMF), *Pseu. aeruginosa* (PSE), Total bacteria count (count, 1 ml, TOTB).

Chemical analysis included total Ammonia as $NH_4$ ($NH_4$), nitrogen analysis using Kjeldahl analysis (NKJ), Nitrate as $NO_3$ ($NO_3$), oil and grease content (O&G), Total Organic Carbon (TOC), Turbidity in the field (TUFD), Dissolved organic carbon (DOC).

The results of the analysis of water before and after treatments are provided in Table 3 and Table 4. Specifically, Table 3 shows the results obtained before the first treatment and at different sampling days after the first treatment and Table 4 shows the results obtained at different sampling days after the second treatment and the third treatment. The results in Table 3 and Table 4 are provided at the different sampling days at propulsion, namely at the onset of pump operation.

TABLE 3

Bacteriological and Chemical Analysis before and after first treatment measured at propulsion

| Parameter | Before treatment | about 21 days after treatment | about 83 days after treatment | about 166 days after treatment | about 283 days after treatment | about 313 days after treatment | about 376 days after treatment |
|---|---|---|---|---|---|---|---|
| CMF | 6 | 0 | 50 | 40 | >120 | 4 | 1 |
| FMF | 0 | 0 | 0 | 0 | 0 | 0 | 0 |
| EMF | 0 | 0 | 0 | 1 | 1 | 1 | 1 |
| PSE | 29 | 10 | 42 | 530 | 0 | 100 | 380 |
| TOTB | 35,000 | 36,000 | 14,000 | 7,800 | 4,400 | 1100 | 7700 |
| $NH_4$ | <0.03 | 1.2 | 0.12 | 0.03 | 0.03 | <0.03 | |
| NKJ | 0.28 | 1.96 | 0.37 | 0.65 | 0.46 | 0.59 | |
| $NO_3$ | 19 | 13 | 15 | 17 | 18 | 21 | 19 |
| O&G | 61,590 | 76,500 | 250,215 | 53,610 | 16,800 | 14,180 | 4,850 |
| pH | | 7.53 | | 7.93 | | 8.25 | 7.17 |
| TOC | 1 | 1.9 | 1.1 | 1.1 | | 0.7 | 0.4 |
| TUFD | 8 | | | | 56.7 | 19.3 | 4 |
| DOC | | | | | 0.7 | | |
| TURB | | | | | | 11 | |

TABLE 4

Bacteriological and Chemical Analysis after second and third treatments measured at propulsion

| Parameter | about 1 month after $2^{nd}$ treatment | about two month after $2^{nd}$ treatment | about four month after $2^{nd}$ treatment | about seven month after $2^{nd}$ treatment | about eleven month after $2^{nd}$ treatment | about thirteen month after $2^{nd}$ treatment and about 1 month after $3^{rd}$ treatment | about fourteen month after $2^{nd}$ treatment and about two month after $3^{rd}$ treatment |
|---|---|---|---|---|---|---|---|
| CMF | <1600 | 7.8 | 0 | 4 | 0 | Plate fully covered | 2 |
| FMF | 0 | 0 | 0 | 0 | 0 | 0 | 0 |
| EMF | 540 | 0 | 0 | 0 | 0 | 0 | 0 |
| PSE | 40 | 7 | 11 | 26 | 8 | 390 | >120 |
| TOTB | <5,700 | 150 | 680 | 880 | 19000 | 5700 | 1800 |
| $NH_4$ | <0.03 | 0.26 | | 1.31 | 0.07 | <0.03 | <0.03 |
| NKJ | 1.24 | 0.81 | 0.44 | 1.15 | 0.71 | 0.45 | 0.37 |
| $NO_3$ | 18 | 17 | 21 | 20 | 20 | 22 | 21 |
| O&G | 20,360 | 4,258 | 2,650 | 1,410 | 3,490 | 9,150 | 7,040 |
| pH | 6.96 | 7.15 | 7.21 | 8 | 7.78 | 8.1 | 7.97 |
| TOC | 0.5 | 0.4 | 0.5 | 0.3 | 0.5 | | |
| TUFD | 92 | 15.5 | 15.3 | 15.3 | 21.8 | 16.5 | 3.62 |

Figure 2:
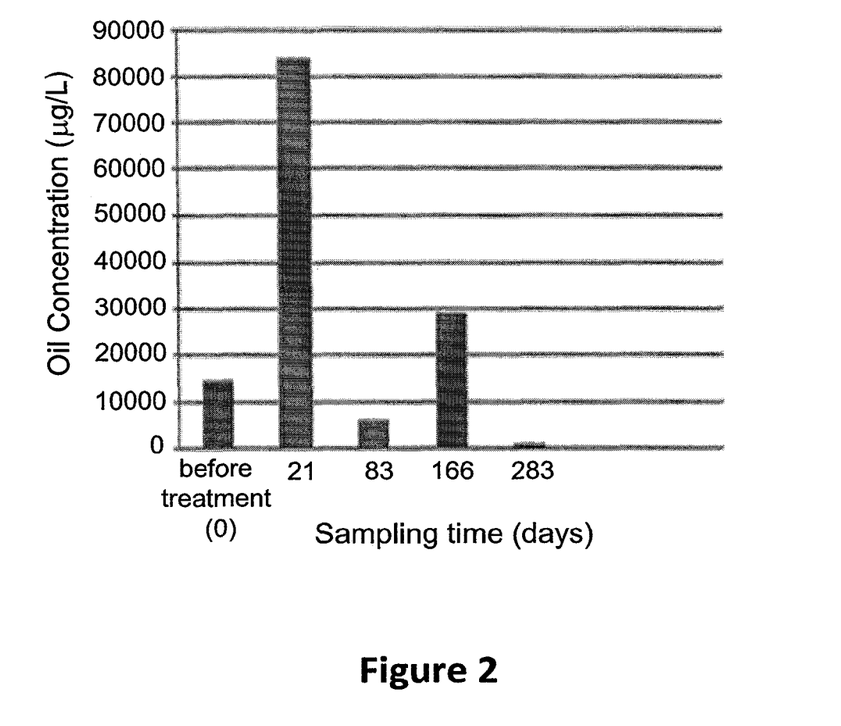
FIG. 2 is a bar graph showing concentration of oil in water samples obtained from the drilling well in Ein Kerem before and after the first bioremediation treatment.
Figure 3:
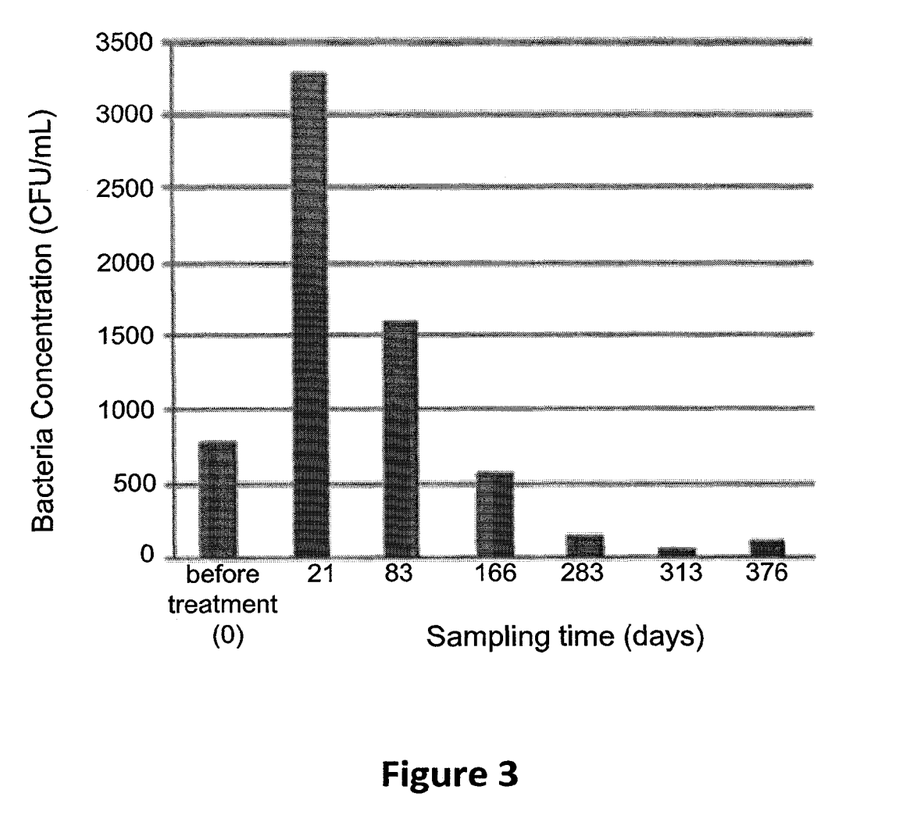
FIG. 3 is a bar graph showing bacterial count in water samples obtained from the drilling well in Ein Kerem before and after the first bioremediation treatment.
Figure 4:
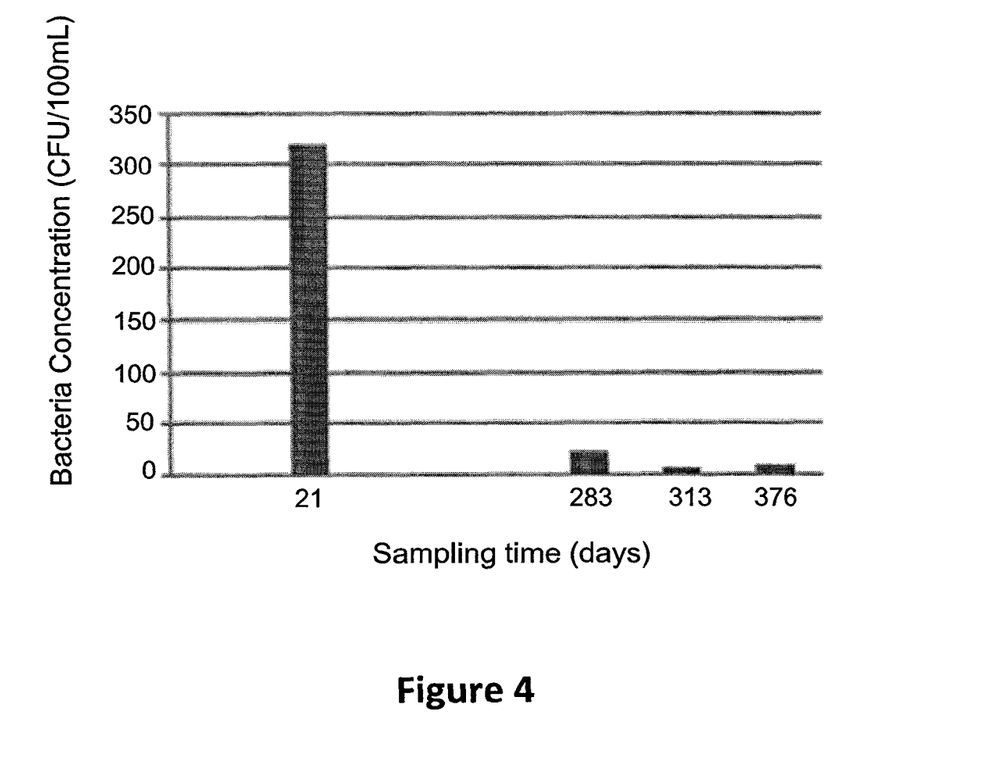
FIG. 4 is a bar graph of the concentration of *Pseudomonas* bacteria, an indicator of water quality in samples obtained from the drilling well in Ein Kerem, before and after the first bioremediation treatment.

The results of oil concentration, total bacteria count and concentration of *pseudomonas* bacteria obtained before the first treatment and at different sampling days after the first treatment are shown, respectively, in FIGS. 2 to 4. The data in FIGS. 2 to 4 correspond to results in water samples obtained at different sampling days as in Table 3 but refer to the results obtained at the indicated days, 1.5 to 2 hours (90 minutes to 120 minutes) after operation of the system (after propulsion).

FIG. 2 shows that oil concentration decreased to the system's threshold value of 300 μg/L. FIG. 3 shows that the total bacteria count reduced to less than 1000 CFU/ml. FIG. 4 shows that the concentration of the *Pseudomonas* bacteria increased significantly with the addition of bacterial cocktail, however, reduced during the analysis period. While the concentration did not return to its level before treatment, the residual amount the bacteria did not negatively affected the total bacteria count.

FIG. 5 show results of the oil concentration obtained at different sampling days after the second treatment and at different sampling days after the third treatment. The data in FIG. 5 correspond to results in water samples obtained at different sampling days as in Table 4 but refer to the results obtained at the indicated days, 2 hours (120 minutes) after operation of the system (after propulsion). For the sake of simplicity, FIG. 5 indicates the sampling days after the second treatment but also refers to the sampling days after the third treatment as indicated in Table 4.

To summarize, the results from the Ein Kerem well show that the bioremediation treatment improved the water quality to be suitable drinking, i.e. treatment was effective and efficient in removing the organic contaminants. In addition, the results show that multiple treatments are effective and can be done in order to maintain the water quality of the well.

Nahusha Well

Nahusha well was drilled in 1983 to a depth of 965 meters. A conventional pump was installed at a depth of 260 meters (a 14" pump with 83 column pipes with a diameter of 12"). The diameter of the protective tubing (pump housing) was 18⅝".

The static level and the dynamic level (with a flow rate of 550 cmh) in the well were determined at 219.1 meters and 228 meters, respectively. Water samples were taken at a flow rate of 550 cmh.

The amount of paraffin oil in Nahusha well was estimated to be 5,000 liters.

Samples were chemically and microbially (biological) analyzed prior to initiating treatment and after treatment. The results are summarized in Table 5 and are provided at propulsion, namely at the onset of pump operation and 120 minutes after pump operation.

TABLE 5

Bacteriological and Chemical Analysis before and after treatment

| Parameter | Before treatment propulsion | about 6 days after treatment propulsion | about 6 days after treatment 120 min | about 13 days after treatment propulsion | about 13 days after treatment 120 min | about 25 days after treatment propulsion | about 25 days after treatment 120 min | about 41 days after treatment propulsion | about 41 days after treatment 120 min | about 46 days after treatment 120 min |
|---|---|---|---|---|---|---|---|---|---|---|
| CMF | 0 | Plate fully covered | Plate fully covered | 350 | >1600 | 50 | 20 | 0 | 0 | 0 |
| FMF | 0 | 11 | 26 | 350 | >1600 | 1 | 1 | 0 | 0 | 0 |
| EMF | 0 | 1 | 19 | 11 | 1 | 0 | 0 | 0 | 0 | 0 |
| PSE | 0 | >1200 | >1200 | 6400 | 2500 | 160 | 68 | 4 | 2 | 0 |
| TOTB | 120 | 29,000 | 260000 | 48,500 | 96900 | 7,000 | 3200 | 3700 | 1500 | 53 |
| pH | 10.45 | 8.36 | 7.2 | 7.93 | 7.38 | 8.12 | 7.4 | 8 | 7.2 | |
| $NH_4$ | 0.18 | | | | | | | | | 0.08 |
| NKJ | 0.35 | 4.07 | 0.28 | 0.24 | 0.56 | 0.28 | 0.52 | 1.52 | 0.2 | |
| $NO_3$ | <1 | <2 | <2 | <2 | <2 | <2 | | <2 | <2 | <2 |
| DO | 2.62 | 1.18 | 1.57 | 1.62 | 1.25 | 1.61 | 1.5 | 0.6 | 10.02 | |
| O&G | <300 | | <300 | 1,340 | 380 | 2,025 | 10.5 | 2,250 | 1960 | <300 |
| TUFD | 0.65 | | | | | | | 0.73 | 0.46 | |
| TOC | <0.2 | 0.3 | <0.2 | 0.2 | <0.2 | | | | | |

Treatment:

Treatment was conducted using the same amount of uric acid as in Ein Kerem well, albeit, this time a mixture of Diammonium Phosphate and Monoammonium Phosphate (total of 10 kg) at ratio of 1:1 was dissolved in a 20 liter tank. The uric acid and ammonium solution were added sequentially into two 2" pipes from the base of the well.

Air was continuously introduced (using a compressor) through a level gauge pipe with a diameter of ¾" at a depth of 248 meters.

Then, the bacteriological cocktail was introduced (10 liters) through two 2" pipes.

The results shown in Table 5 indicate that after 42 days from treatment there was a sharp decrease in the bacteriological count. In addition, the measurements obtained after 120 minutes also suggest a reduction in oil content in the water.

Revivim Well

Revivim well was drilled in 1996 to a depth of 745 meters. The well comprised a conventional pump that of 360 meters deep (a 12" diameter vertical pump with 10" column pipes). The diameter of the protective tubing (a pump house) was 18⅝".

The static level of the well and the dynamic level (a flow rate of 350 cmh) were determined to be 301 meters and 313 meters, respectively.

The amount of oil in Revivim well was estimated to be 5,000 liters.

Treatment:

Treatment was conducted by adding the same amount of uric acid as in Oza well which was introduced via the pump head (penetration to a depth of 290 meters, approx. 10 meters above the static level), which was then washed with water, to thereafter introduce a solution of 2 kg diammonium phosphate in a 20 liter tank, and washed down with water. A compressor was used for continues flow of air, through a ¾" steel pipe to a depth of 360 meters.

To initiate treatment, 20 liters of the bacterial cocktail was introduced at a concentration of $10^9$ in milliliters, in total: approx. $10^{13}$ bacteria.

As can be seen from Table 6, a significant reduction was observed in the amount of oil was observed after addition of bacteria. The results are provided at propulsion, namely at the onset of pump operation

TABLE 6

Bacteriological and Chemical Analysis before and after treatment

| Parameter | about 6 days after treatment | about 13 days after treatment | about 34 days after treatment | about 55 days after treatment | about 223 days after treatment |
|---|---|---|---|---|---|
| CMF | 0 | 0 | 0 | 0 | 0 |
| FMF | 0 | 0 | 0 | 0 | 0 |
| EMF | 0 | 0 | 0 | 0 | 0 |
| PSE | 9 | >12000 | 620 | 48 | 0 |
| TOTB | 230 | 1,700 | 970 | 930 | 180 |
| pH | 7 | 7.1 | 6.85 | 7 | 7.1 |
| $NH_4$ | 0.3 | <0.03 | 0.25 | 0.27 | 0.29 |
| NKJ | 0.42 | 0.53 | 1.03 | 0.49 | 0.56 |
| $NO_3$ | <1 | <1 | <1 | <1 | <1 |
| O&G | 170,800 | 73,600 | 374,700 | 26,500 | <300 |
| TUFD | 9 | 70 | 0.24 | 2.86 | 0.25 |
| TOC | <0.2 | | | | |
| DOC | | | | | 0.6 |

The invention claimed is:

1. A method of bioremediation of organic contaminated water for bioremediation of organic contaminants comprising a lubricating oil, the lubricating oil contaminating water within an annulus of an oil lubricated shaft below ground level within a water well, comprising:
   introducing into a continuous phase of water contaminated with the lubricating oil within the annulus of said oil lubricated shaft of the water well an amount of a bioremediation combination comprising
      (i) a microbial cocktail capable of biodegrading the lubricating oil contaminating the continuous phase of water within the annulus and
      (ii) a nitrogen source,
   such that said bioremediation combination is brought into contact with the continuous phase of water within the annulus suspected of being contaminated with the lubricating oil in said annulus;
   supplying into said annulus an oxygen source for a time sufficient for biodegradation of at least a portion of said organic contaminants in the water within the annulus, wherein introducing said oxygen source is via an oxygen pipe having an outlet which is submerged in the continuous phase of water within the annulus.

2. The method of claim 1, wherein the remediation combination comprises a phosphate source.

3. The method of claim 1, wherein said introducing of the bioremediation combination is via at least one delivery conduit having at least an outlet within the annulus.

4. The method of claim 1, comprising testing level of organic contaminants in the water and if said level is above a predefined threshold, supplying a further amount of at least said microbial cocktail.

5. The method of claim 1, wherein said nitrogen source is uric acid.

6. The method of claim 2, wherein said phosphate source is a phosphate salt.

7. The method of claim 6, wherein the phosphate salt is selected from diammonium phosphate and monoammonium phosphate.

8. The method of claim 1, for bioremediation of organic contaminants wherein at least a portion of the lubricating oil contaminating the continuous phase of water of the annulus rests as a top layer on the surface of the continuous phase of water of the annulus.

9. The method of claim 8, wherein said lubricating oil is paraffin oil.

10. The method of claim 1, wherein said microbial cocktail comprise at least one bacteria selected from the group consisting of *Bacillus thuringiensis, Delftia tsuruhatensis, Leucobacter alluvii, Novosphingobium panipatense, Ochrobactrum intermedium, Rhizobium cellulosilyticum* and *Sphingobacterium daejeonense*.

11. The method of claim 1, wherein said oxygen source is air, oxygen gas, or oxygen saturated liquid.

12. The method of claim 1, wherein the amount of oxygen introduced into the annulus is between about 10% to about 100% of oxygen saturation level.

13. The method of claim 1, wherein said time is sufficient to biodegrade at least 30% of said organic contamination.

14. The method of claim 1, further comprising locating a lubricated water pump comprising said oil lubricated shaft below ground level in the water well prior to said introducing and supplying steps, wherein the water is fed from the below ground level lubricated water pump comprising said oil lubricated shaft by pumping the water from the below ground level lubricated water pump upwardly to ground level and discharge from the water well.

15. The method of claim 14, wherein the lubricated water pump pumps water during the bioremediation.

16. The method of claim 1, wherein all feeds for bioremediation of the annulus have an absence of an additional carbon nutrient source.

* * * * *